United States Patent
Caveney

(10) Patent No.: US 7,865,299 B2
(45) Date of Patent: Jan. 4, 2011

(54) METHOD AND SYSTEM FOR PREDICTING A FUTURE POSITION OF A VEHICLE USING NUMERICAL INTEGRATION

(75) Inventor: Derek S. Caveney, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1101 days.

(21) Appl. No.: 11/554,150

(22) Filed: Oct. 30, 2006

(65) Prior Publication Data

US 2008/0071469 A1 Mar. 20, 2008

Related U.S. Application Data

(60) Provisional application No. 60/825,589, filed on Sep. 14, 2006.

(51) Int. Cl.
G01C 21/00 (2006.01)

(52) U.S. Cl. .................. 701/207; 701/38; 701/42; 701/45; 701/200; 701/220; 180/6.2; 180/252; 180/415; 342/357.01; 342/357.06; 342/357.08; 342/357.14

(58) Field of Classification Search ............ None
See application file for complete search history.

(56) References Cited

U.S. PATENT DOCUMENTS

| | | | |
|---|---|---|---|
| 4,680,959 A * | 7/1987 | Henry et al. | 73/115.02 |
| 4,706,771 A * | 11/1987 | Kawabe et al. | 180/415 |
| 6,073,065 A * | 6/2000 | Brown et al. | 701/36 |
| 6,202,007 B1 * | 3/2001 | Spicer | 701/3 |
| 6,675,074 B2 * | 1/2004 | Hathout et al. | 701/1 |
| 6,761,060 B2 * | 7/2004 | Mancosu et al. | 73/146 |
| 6,816,799 B2 * | 11/2004 | Yu et al. | 702/94 |
| 6,859,170 B2 * | 2/2005 | Devereux et al. | 342/357.06 |
| 6,865,461 B2 * | 3/2005 | Neef et al. | 701/41 |
| 6,907,391 B2 * | 6/2005 | Bellora et al. | 703/8 |
| 7,222,007 B2 * | 5/2007 | Xu et al. | 701/38 |
| 7,610,121 B2 * | 10/2009 | Nishira et al. | 701/1 |
| 2003/0150961 A1 * | 8/2003 | Boelitz et al. | 244/172 |
| 2004/0064235 A1 * | 4/2004 | Cole | 701/70 |
| 2005/0149240 A1 * | 7/2005 | Tseng et al. | 701/38 |
| 2007/0005212 A1 * | 1/2007 | Xu et al. | 701/70 |
| 2007/0078566 A1 * | 4/2007 | Wang et al. | 700/259 |

* cited by examiner

Primary Examiner—Khoi Tran
Assistant Examiner—Jonathan L Sample
(74) Attorney, Agent, or Firm—Gifford, Krass, Sprinkle, Anderson & Citkowski, P.C.

(57) ABSTRACT

A method and system for predicting a future position of a horizon time $T_h$ of an automotive vehicle. The method determines the position of the vehicle at time $T_0$ using GPS and the speed, acceleration and angle of the steering wheel at time $T_0$ from appropriate sensors on the vehicle. A nonlinear mathematical model utilizing these factors is then created while the position of the vehicle at time $T_0+T_h$ is determined through numerical integration of the mathematical model using an adjustable step size $T_{step}$. The step $T_{step}$ is modified adaptively in accordance with the accuracy requirements of the vehicle.

19 Claims, 1 Drawing Sheet

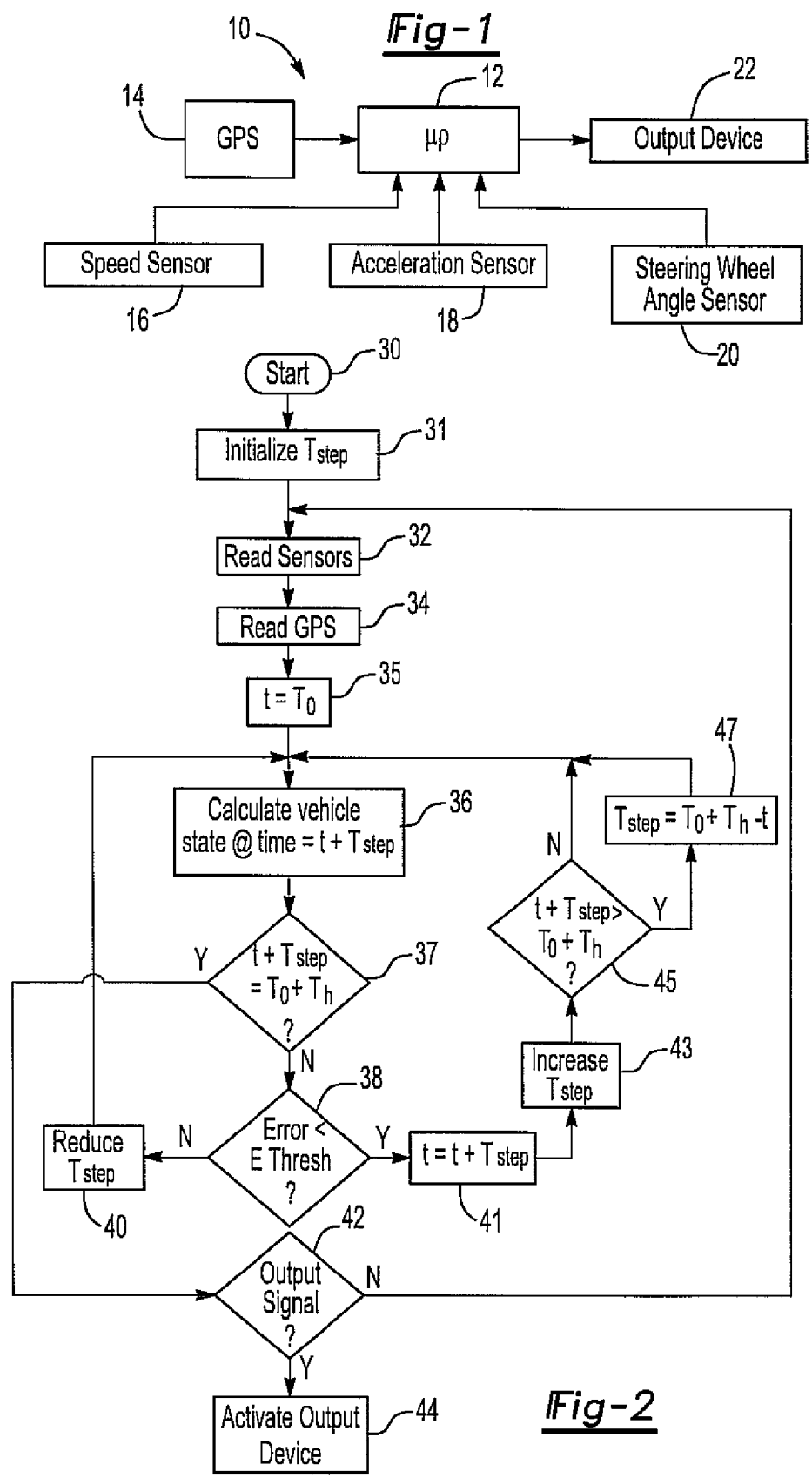

METHOD AND SYSTEM FOR PREDICTING A FUTURE POSITION OF A VEHICLE USING NUMERICAL INTEGRATION

RELATED APPLICATION

This application claims priority of U.S. Provisional Patent Application Ser. No. 60/825,589 filed Sep. 14, 2006, which is incorporated herein by reference.

BACKGROUND OF THE INVENTION

I. Field of the Invention

The present relates generally to a method and system for predicting a future position of an automotive vehicle and, more particularly, to such a system utilizing numerical integration of a nonlinear model.

II. Description of Related Art

Many modern automotive vehicles are equipped with some form of vehicle dynamic stability system. Such systems incorporate wheel speed sensors, yaw rate sensors and accelerometers having output signals that are coupled as input signals to a processing unit to control the stability system. Many modern vehicles also include a global positioning system (GPS) receiver to identify the position of the automotive vehicle, typically for a navigation system. Furthermore, current GPS systems of the type used in automotive vehicles typically exhibit an accuracy of one meter or better.

Dedicated short-range communications (DSRC) constitute the leading wireless technology under consideration for cooperative vehicle safety applications. In such systems, automotive vehicles communicate with each other utilizing wireless communications in an effort to increase vehicle safety by decreasing collisions between two or more vehicles. In some systems, an appropriate warning system is provided to the driver of a vehicle warning of an impending collision while, in other systems, the vehicle brakes may be automatically actuated in an attempt to avoid a collision.

In order to achieve crash avoidance between two vehicles, it is necessary to predict the position of the vehicle at a future time within a relatively short time window, typically three to five seconds. Such a relatively short time will enable the operator of the vehicle to apply the brakes, or apply the brakes automatically, in order to avoid the crash.

In order to predict the future position of an automotive vehicle it is conventional to utilize a mathematical nonlinear model of the vehicle. Conventional models include the constant acceleration kinematic model (CA), the kinematic unicycle model (KU), the kinematic bicycle model (KB) or the classic bicycle model (CB). Each model consists of differential equations which, when solved, represent the dynamic action of the automotive vehicle.

Once the model has been selected, the previously utilized approach was to utilize the Kalman Prediction to predict the future horizon position of the vehicle at time $T_0+T_h$ where $T_h$ equals the horizon time offset into the future from the current time $T_0$. Since all of the models are nonlinear, continuous time models, in order to apply the discrete Kalman equations, the nonlinear continuous time models must first be linearized through derivation of the Jacobian state transition matrix and the input gain matrix. In addition, the Kalman Prediction requires that a discrete time system model propagate forward through the prediction horizon $T_h$. Therefore, at each propagation step, $T_{step}$, the linearized, continuous-time system must be discretized as follows:

$$\dot{x}(t) \sim \nabla F x(t) + \nabla G u(t)$$

$$\Downarrow$$

$$x[k+1] = A_d x[k] + B_d u[k]$$

where $A_d$ is an n×n matrix, $B_d$ is an n×p matrix, and where $A_d$ and $B_d$ are the discretized system using the sample time $T_{step}$.

While the Kalman Prediction has proven sufficiently accurate in automotive systems for predicting the future position of the vehicle, the Kalman Prediction is necessarily computationally intensive. Since microprocessors of the type used in automotive vehicles, for cost considerations, are not extremely fast, the computational-intensive equations required by the Kalman Prediction mandate relatively long time steps $T_{step}$ between sequential equations. This, in turn, can introduce error into the predicted future position of the vehicle.

SUMMARY OF THE PRESENT INVENTION

The present invention provides both a method and system which overcomes the above-mentioned disadvantages of the previously known systems and methods.

In brief, the present system and method is utilized in conjunction with an automotive vehicle having speed, acceleration and steering control or steering wheel sensors which output signals indicative, respectively, of the vehicle velocity, acceleration and position of the steering wheel. All of these sensors are coupled as input signals to a processing unit. Furthermore, additional vehicle sensors, such as yaw-rate gyroscopes, lateral accelerometers, and pitch sensors can be included.

The processing unit also receives the position of the automotive vehicle through a conventional global positioning system (GPS).

Like the previously known systems, the present invention then utilizes one of the conventional kinematic models, e.g. the CA, KU or CV models, as the mathematical model of the vehicle. Then, by utilizing that model, the present invention calculates the position of the vehicle at time $T_0+T_{horiz}$ through numerical integration of the mathematical model using a step size $T_{step}$.

Preferably, Runge-Kutta-Fehlberg (RKF) method is utilized for the numerical integration. Other numerical integration methods may, however, alternately be used.

For improved accuracy, two different orders of the RKF may be utilized in order to determine an error term. For example, the truncation error between the fourth and fifth-order RKF numerical integration may be computed and used to adaptively vary the time step $T_{step}$ used in the numerical integration. For example, whenever the truncation error between the fourth and fifth RKF integration exceeds a preset threshold, the time step $T_{step}$ may be reduced for enhanced accuracy, and vice versa.

In practice, the prediction of the future vehicle position using the RKF integration approximates or even exceeds the accuracy of the vehicle position using the Kalman Prediction, but with substantially fewer computations. As such, less expensive microprocessors, or a processor with shared functions, may be utilized to predict the future position of the vehicle.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a block diagrammatic view illustrating an exemplary system of the present invention; and FIG. 2 is a flowchart illustrating the operation of the preferred embodiment of the present invention.

DETAILED DESCRIPTION OF A PREFERRED EMBODIMENT OF THE PRESENT INVENTION

With reference first to FIG. 1, a simplified block diagram of a preferred embodiment of the future path prediction system 10 of the present invention is shown and comprises a microprocessor 12. The microprocessor 12 receives inputs from a plurality of different sensors. For example, a GPS system 14 of the type found on modern vehicles, particularly modern vehicles with navigation systems, provides an input signal to the microprocessor 12 indicative of the current position at time $T_0$ of the automotive vehicle.

Similarly, a speed sensor 16 provides an output signal to the microprocessor 12 of the vehicle speed at time $T_0$ while an acceleration sensor 18 provides an output signal to the microprocessor 12 indicative of the longitudinal acceleration of the vehicle.

A steering control or steering wheel angle sensor 20 also provides an output signal to the microprocessor 12 representative of the angle of the steering wheel. It will be understood, of course, that other steering controls, such as a joystick, may be utilized in lieu of the steering wheel without deviation from the spirit or scope of the invention.

In a fashion that will subsequently be described in greater detail, the microprocessor 12, after computation of a predicted future position of the vehicle, generates an output signal to an output device 22 when an adverse situation, such as a collision, is detected. The output device 22 may be simple in construction, e.g. a warning light or warning audible signaling device, or more complex, such as a device to automatically actuate the vehicle brakes.

In order to predict the future position of the automotive vehicle, a mathematical model of the automotive vehicle is selected which takes into account the translational and rotational speed and acceleration of the vehicle. One such mathematical model is the constant acceleration kinematic model (CA) which is defined in discrete time with a sampling time T. The CA model does not require numerical integration to compute the prediction. The CA model is defined as follows:

$$x_{CA}[k+T] = \begin{bmatrix} x \\ \dot{x} \\ y \\ \dot{y} \end{bmatrix}[k+T]$$

$$= \begin{bmatrix} 1 & T & 0 & 0 \\ 0 & 1 & 0 & 0 \\ 0 & 0 & 1 & T \\ 0 & 0 & 0 & 1 \end{bmatrix} \begin{bmatrix} x \\ \dot{x} \\ y \\ \dot{y} \end{bmatrix}[k] + \begin{bmatrix} 0.5T^2 & 0 \\ T & 0 \\ 0 & 0.5T^2 \\ 0 & T \end{bmatrix} u$$

with $$\begin{bmatrix} x \\ \dot{x} \\ y \\ \dot{y} \end{bmatrix}[0] = \begin{bmatrix} x[0] \\ v_x[0]\cos(\psi) \\ y[0] \\ v_x[0]\sin(\psi) \end{bmatrix} \text{ and }$$

$$u = \begin{bmatrix} \cos(\psi) & -\sin(\psi) \\ \sin(\psi) & \cos(\psi) \end{bmatrix} \begin{bmatrix} a_x[0] \\ a_y[0] \end{bmatrix}$$

where x, y, and $\psi$ are with respect to the earth coordinate frame and $v_x$, $v_y$, $a_x$, and $a_y$ are with respect to the vehicle fixed coordinate frame, x is the longitude with positive East, y is latitude with positive North, and $\psi$ is the vehicle heading positive counterclockwise from the x axis. $v_x$ is the longitudinal velocity of the vehicle, $v_y$ is the lateral velocity, $a_x$ is the longitudinal acceleration, and $a_y$ is the lateral acceleration.

If the lateral acceleration of the vehicle is measured to be or is assumed to be zero, u reduces to $u=[a_x[0] \cos(\psi) a_x[0] \sin(\psi)]^T$.

The CA model does not depend on any vehicle parameters or time-varying variables and thus T will equal the prediction horizon $T_h$. Only one evaluation of the model is required for the path prediction if only the position at the end of the horizon is of interest. However, in some situations, such as collision avoidance applications, the prediction at intermediate path positions is desirable.

A second mathematical model is the kinetic unicycle model (KU) which is defined by the following nonlinear continuous time equations:

$$\dot{x}_{KU} = \begin{bmatrix} \dot{x} \\ \dot{y} \\ \dot{\psi} \\ \dot{v}_x \end{bmatrix} = \begin{bmatrix} v_x \cos(\psi) \\ v_x \sin(\psi) \\ \omega[0] \\ a_x[0] \end{bmatrix}$$

where $\omega[0]$ is the yaw rate measurement.

A third model is the kinetic bicycle model (KB) which is similar to the KU model and is defined by the following equations:

$$\dot{x}_{KB} = \begin{bmatrix} \dot{x} \\ \dot{y} \\ \dot{\psi} \\ \dot{v}_x \end{bmatrix} = \begin{bmatrix} v_x\cos(\psi + dw[0]) \\ v_x\sin(\psi + dw[0]) \\ [v_x/(a+b)]\sin(dw[0]) \\ a_x[0] \end{bmatrix}$$

where the constant input dw[0] is the wheel angle measurement, a and b are the perpendicular distances from the front and rear axles to the vehicle's center of gravity, respectively. Thus a+b is the wheelbase of the vehicle.

A yet further model which may be used in the position prediction method and system of the present invention is the classic bicycle model (CB) which includes additional vehicle parameters such as the vehicle mass M and yaw inertia $J_z$. The CB model is defined as follows:

$$\dot{x}_{CB} = \begin{bmatrix} \dot{x} \\ \dot{y} \\ \dot{\psi} \\ \dot{v}_x \\ \dot{v}_y \\ \dot{\omega} \end{bmatrix} = \begin{bmatrix} v_x\cos(\psi) - v_y\sin(\psi) \\ v_x\sin(\psi) + v_y\cos(\psi) \\ \omega \\ a_x[0] \\ f_1(v_x, v_y, \omega, dw[0]) \\ f_2(v_x, v_y, \omega, dw[0]) \end{bmatrix}$$

with $$f_1(v_x, v_y, \omega, dw) = \frac{-2(C_{af} + C_{ar})v_y}{Mv_x} + \left[\frac{-2(C_{af}a - C_{ar}b)}{Mv_x} - v_x\right]\omega + \left(\frac{2C_{af}}{M}\right)dw$$

and $$f_2(v_x, v_y, \omega, dw) = \frac{-2(C_{af}a + C_{ar}b)v_y}{J_z v_x} + \left(\frac{-2(C_{af}a^2 - C_{ar}b^2)}{J_z v_x}\right)\omega + \left(\frac{2C_{af}a}{J_z}\right)dw$$

where $C_{af}$ and $C_{ar}$ are the front and rear cornering stiffnesses, respectively. Again, $v_y[0]$ will be set to zero as no measurement or estimate is assumed.

In order to predict the position of the vehicle using one of the selected mathematical models at the horizon time $T_h$, the present invention utilizes numerical integration rather than the Kalman Prediction. As such, unlike the Kalman Prediction, there is no need to explicitly linearize or discretize the system. Similarly, unlike the Kalman Prediction, numerical integration has no indication of uncertainty in its estimates but, rather, is fully deterministic.

In applying numerical integration, the time-invariant system dynamics are described as follows:

$$x(t) = f(x(t), u(t))$$

In order to enhance the efficiency of the calculation, it is desirable to select a numerical integration method with the fewest number of function, f( ), evaluations. A relatively low number of function, f( ), evaluations also enables evaluations to be made with a smaller time step size, $T_{step}$, when desired or when required.

Although any conventional numerical integration method may be utilized in accordance with the present invention, preferably a fifth-order method based on Runge-Kutta-Fehlberg (RKF) is utilized. Such a method is advantageous because it allows a fifth-order accuracy with only six evaluations of the function f( ).

A still further advantage of utilizing a fifth-order RKF equation is that the same six function evaluations may be combined to form both a fourth-order and fifth-order method. This, in turn, allows the difference between the fourth and fifth-order estimates to be used as an estimate of the truncation error that can in turn be used to adjust the step size $T_{step}$. For example, whenever the truncation error exceeds a predetermined threshold, $E_{thresh}$, the step size $T_{step}$ can be reduced in order to increase accuracy, and vice versa.

Evaluation of the differential equations defining the various mathematical models using the RKF numerical integration are well known and widely available so that a further description thereof is unnecessary. For example, such equations may be found in MathWorks as well as other software packages.

With reference now to FIG. 2, a simplified flowchart illustrating the operation of the present invention is illustrated and the CB model used herein for exemplary purposes only. After initiation of the algorithm at step 30, step 30 proceeds to step 31 and sets the initial value of $T_{step}$. Step 31 then proceeds to step 32 where the values of the various vehicle sensors are inputted or read by the microprocessor 12. Step 32 then proceeds to step 34.

At step 347 the vehicle position is determined from the GPS system 14. Step 34 then proceeds to step 35 where the time t is set to $T_0$. Step 35 then proceeds to step 36.

At step 36 the microprocessor 12, using numerical integration, such as RKF integration, calculates the state of the vehicle, which includes the X, Y position, at the time $t+T_{step}$. Step 36 then proceeds to step 37.

At step 37 the time $t+T_{step}$ is compared to the horizon time $T_0+T_h$. If not, step 37 proceeds to step 38.

At step 38, the algorithm determines whether the error between two different orders of numerical integration prediction, e.g. between a fourth and fifth-order RKF prediction, is less than a threshold $E_{thresh}$. If not, step 38 branches to step 40 where the time step $T_{step}$ is reduced by an amount proportional to the error. Step 40 then proceeds back to step 36 where the above process is repeated.

Conversely, if the error is less than the threshold $E_{thresh}$, step 38 instead proceeds to step 41 where time t is set to $t+T_{step}$. Step 41 then proceeds to step 43 where the time increment $T_{step}$ is increased by an amount proportional to the error. Step 43 then proceeds to step 45.

At step 45 the algorithm determines if the time $t+T_{step}$ is past the horizon time $T_0+T_h$. If so, step 45 branches to step 47 where $T_{step}$ is set to $T_0+T_h-t$. Step 47 then proceeds back to step 36 where the above process is repeated. Similarly, if the time $t+T_{step}$ is less than the horizon time $T_0+T_h$, step 45 also proceeds to step 36.

After the above process has reiterated until the horizon time $T_0+T_h$ has been reached, step 37 then branches to step 42. At step 42, the microprocessor 12 determines whether or not an output signal should be sent to warn the driver of an upcoming adverse event should be generated. For example, in the event of an impending collision, the microprocessor, based upon the future prediction of the vehicle position, may anticipate a collision. In this event, step 42 proceeds to step 44 where the microprocessor activates the output device 22. The output device 22 may comprise, for example, an optical or audible warning signal for the driver, may automatically actuate the vehicle brakes, etc.

Conversely, in the event that it is determined that the output device 22 need not be actuated or following actuation of the output device 22, step 42 or 44 branches back to step 32 where the above algorithm is repeated.

For comparison purposes, the computational efficiency of the classic bicycle (CB) model using RKF numerical integration was compared with the classic bicycle model using Kalman Prediction (CLM) under different driving conditions. As shown in Table 1 below, processing using RKF numerical integration in accordance with the present invention is approximately four to five times more efficient, i.e. four times faster, than the comparable Kalman Prediction method:

TABLE 1

| Model ID | Prediction Horizon (seconds) | | | | |
|---|---|---|---|---|---|
| | 1 sec | 2 sec | 3 sec | 4 sec | 5 sec |
| | Computation Time (milliseconds) | | | | |
| CA | 0.02 | 0.02 | 0.02 | 0.02 | 0.02 |
| KU | 0.86 | 0.86 | 0.88 | 0.93 | 0.97 |
| KB | 0.90 | 0.90 | 0.94 | 1.00 | 1.10 |
| CL1 | 0.02 | 0.02 | 0.02 | 0.02 | 0.02 |
| CLM | | | | | |
| Overall | 11.6 | 22.3 | 32.8 | 43.4 | x 54.4 |
| Accelerating | 11.5 | 22.0 | 34.1 | 42.7 | 60.0 |
| Braking | 12.1 | 23.7 | 33.1 | 45.0 | 55.1 |
| Straight-away | 12.0 | 22.5 | 33.4 | 43.1 | 56.9 |
| S-curves | 11.9 | 22.7 | 33.1 | 43.4 | 58.2 |
| CB | | | | | |
| Overall | 2.90 | 5.10 | 7.30 | 9.30 | 12.1 |
| Accelerating | 2.50 | 3.90 | 5.60 | 6.70 | 8.70 |
| Braking | 3.00 | 4.60 | 6.60 | 8.60 | 11.2 |
| Straight-away | 3.10 | 4.20 | 5.70 | 7.10 | 8.50 |
| S-curves | 2.90 | 4.90 | 6.60 | 8.40 | 10.4 |

Furthermore, as shown in Table 2 below, the accuracy of the prediction of the vehicle position at the future horizon time $T_h$ utilizing the RKF numerical integration in accordance with the present invention approximates and in many driving conditions exceeds the Kalman Prediction method:

TABLE 2

| Model ID | Prediction Horizon (seconds) | | | | |
|---|---|---|---|---|---|
| | 1 sec | 2 sec | 3 sec | 4 sec | 5 sec |
| | Accuracy Error (meters) | | | | |
| CA | 1.09 | 4.01 | 8.66 | 14.8 | 22.3 |
| KU | 0.31 | 1.18 | 3.29 | 7.05 | 12.6 |
| KB | 0.78 | 2.75 | 6.47 | 12.4 | 20.7 |
| CL1 | 1.24 | 4.32 | 9.12 | 15.4 | 23.0 |
| CLM | | | | | |
| Overall | 1.24 | 2.21 | 4.18 | 8.97 | 16.7 |
| Accelerating | 0.72 | 1.27 | 2.11 | 4.43 | 8.73 |
| Braking | 0.34 | 2.05 | 5.20 | 9.51 | 14.1 |
| Straight-away | 0.14 | 0.23 | 0.48 | 1.24 | 3.31 |
| S-curves | 2.43 | 3.55 | 5.70 | 14.2 | 28.7 |
| CB | | | | | |
| Overall | 0.25 | 1.00 | 3.05 | 6.83 | 12.5 |
| Accelerating | 0.12 | 0.50 | 1.59 | 3.67 | 7.00 |
| Braking | 0.35 | 2.04 | 5.19 | 9.49 | 14.1 |
| Straight-away | 0.09 | 0.21 | 0.46 | 0.96 | 2.70 |
| S-curves | 0.31 | 1.42 | 4.87 | 11.1 | 20.1 |

From the foregoing, it can be seen that the present invention provides both a system and method for predicting the future position of an automotive vehicle at a time horizon which, by utilizing numerical integration, is much more efficient and substantially as accurate or more accurate as calculations of the future vehicle position utilizing Kalman Prediction.

Having described our invention, however, many modifications thereto will become apparent to those skilled in the art to which it pertains without deviation from the spirit of the invention as defined by the scope of the appended claims.

I claim:

1. A method for predicting a future position of an automotive vehicle having a steering control comprising the steps of:
   determining the position of the vehicle at time $T_0$,
   determining the translational and rotational speeds of the vehicle at time $T_0$,
   determining the translational and rotational accelerations of the vehicle at time $T_0$,
   determining an angle of the steering control at time $T_0$,
   creating a mathematical model of the vehicle using the position, speeds, accelerations and steering control angle at time $T_0$,
   calculating the position of the vehicle at a horizon time $T_0+T_h$ through numerical integration of the mathematical model,
   wherein said calculating step further comprises the steps of:
   calculating the position of the vehicle at time $T_0+T_h$ through numerical integration of the mathematical model of a first order of accuracy utilizing a step size $T_{step}$,
   calculating the position of the vehicle at time $T_0+T_h$ through numerical integration of the mathematical model of a second order of accuracy,
   determining a truncation error between the first and second order of the calculated position of the vehicle at time $T_0+T_h$,
   adjusting $T_{step}$ as a function of the determined truncation error.

2. The invention as defined in claim 1 wherein said calculating step further comprises the step of calculating the position of the vehicle at time $T_0+T_h$ through a Runge-Kutta numerical integration of the mathematical model.

3. The invention as defined in claim 1 wherein said calculating step further comprises the step of calculating the position of the vehicle at time $T_0+T_h$ through a Runge-Kutta-Fehlberg numerical integration of the mathematical model.

4. The invention as defined in claim 1 wherein said adjusting step comprises the step of reducing $T_{step}$ whenever the truncation error exceeds a predetermined threshold.

5. The invention as defined in claim 1 wherein said adjusting step comprises the step of increasing $T_{step}$ whenever the truncation error is less than a predetermined threshold.

6. The invention as defined in claim 1 wherein said position determining step comprises the step of determining the position of the vehicle using the global position system.

7. The invention as defined in claim 1 wherein said angle determining step comprises the step of reading a steering wheel angle sensor.

8. The invention as defined in claim 1 wherein said speeding determining step comprises the step of reading a vehicle speed sensor.

9. The invention as defined in claim 1 wherein said mathematical model creating step comprises the step of creating a mathematical model selected from the group of a constant acceleration kinematic model, kinematic unicycle model or classic bicycle model.

10. A system for predicting a future position of an automotive vehicle having a steering control comprising:
- means for determining the position of the vehicle at time $T_0$,
- means for determining the translational and rotational speeds of the vehicle at time $T_0$,
- means for determining the translational and rotational accelerations of the vehicle at time $T_0$,
- means for determining an angle of the steering control at time $T_0$,
- means for creating a mathematical model of the vehicle using the position, speeds, accelerations and steering control angle at time $T_0$,
- means for calculating the position of the vehicle at a horizon time $T_0+T_h$ through numerical integration of the mathematical model,
wherein said means for calculating further comprises:
- means for calculating the position of the vehicle at time $T_0+T_h$ through numerical integration of the mathematical model of a first order of accuracy using step size $T_{step}$,
- means for calculating the position of the vehicle at time $T_0+T_h$ through numerical integration of the mathematical model of a second order of accuracy,
- means for determining a truncation error between the first and second order of the calculated position of the vehicle at time $T_0+T_h$,
- means for adjusting $T_{step}$ as a function of the determined truncation error.

11. The invention as defined in claim 10 wherein said means for calculating further comprises means for calculating the position of the vehicle at time $T_0+T_h$ through a Runge-Kutta numerical integration of the mathematical model.

12. The invention as defined in claim 10 wherein said means for calculating further comprises means for calculating the position of the vehicle at time $T_0+T_h$ through a Runge-Kutta-Fehlberg numerical integration of the mathematical model.

13. The invention as defined in claim 10 wherein said means for adjusting comprises means for reducing $T_{step}$ whenever the truncation error exceeds a predetermined threshold.

14. The invention as defined in claim 10 wherein said means for adjusting comprises means for increasing $T_{step}$ whenever the truncation error is less than a predetermined threshold.

15. The invention as defined in claim 10 wherein said position determining means comprises means for determining the position of the vehicle using the global position system.

16. The invention as defined in claim 10 wherein said angle determining means comprises means for reading a steering wheel angle sensor.

17. The invention as defined in claim 10 wherein said speeding determining means comprises means for reading a vehicle speed sensor.

18. The invention as defined in claim 10 wherein said mathematical model creating means comprises means for creating a mathematical model selected from the group of a constant acceleration kinematic model, kinematic unicycle model or classic bicycle model.

19. The invention as defined in claim 10 wherein said calculating means comprises a microprocessor.

* * * * *

UNITED STATES PATENT AND TRADEMARK OFFICE
CERTIFICATE OF CORRECTION

PATENT NO. : 7,865,299 B2  Page 1 of 1
APPLICATION NO. : 11/554150
DATED : January 4, 2011
INVENTOR(S) : Derek S. Caveney It is certified that error appears in the above-identified patent and that said Letters Patent is hereby corrected as shown below:

Column 6, Line 30, Replace "step 347" with --step 34--

Signed and Sealed this
Twenty-seventh Day of December, 2011

David J. Kappos
*Director of the United States Patent and Trademark Office*